United States Patent
Ramakrishnan et al.

(10) Patent No.: US 10,891,147 B1
(45) Date of Patent: Jan. 12, 2021

(54) EXTENDING APPLICATION TIERS ACROSS A LARGE-SCALE HETEROGENEOUS DATA CENTER

(71) Applicant: CISCO TECHNOLOGY, INC., San Jose, CA (US)

(72) Inventors: Vijayan Ramakrishnan, Milpitas, CA (US); Saurabh Jain, Fremont, CA (US); Vijay Chander, San Ramon, CA (US); Ronak K. Desai, Fremont, CA (US); Praveen Jain, Cupertino, CA (US); Munish Mehta, Fremont, CA (US); Yibin Yang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 508 days.

(21) Appl. No.: 15/376,365

(22) Filed: Dec. 12, 2016

Related U.S. Application Data

(60) Provisional application No. 62/334,138, filed on May 10, 2016.

(51) Int. Cl.
*G06F 9/455* (2018.01)

(52) U.S. Cl.
CPC .......... *G06F 9/45558* (2013.01); *G06F 2009/45595* (2013.01)

(58) Field of Classification Search
CPC .. G06F 9/5077; G06F 9/45558; G06F 9/5011; G06F 9/5083
See application file for complete search history.

(56) References Cited

U.S. PATENT DOCUMENTS

2016/0218918 A1* 7/2016 Chu et al. ........... H04L 41/5054
2016/0330125 A1* 11/2016 Mekkattuparamban et al. ........... H04L 12/4633

OTHER PUBLICATIONS

Adam Raffe, Learning ACI, Feb. 17, 2016, WordPress, adamraffe. com/learning-aci/, retrieved on Nov. 16, 2018 (Year: 2016).*
Carl Niger, Cisco ACI Bootcamp: Notes and Thoughts Part 3, Aug. 20, 2014, WordPress, comeroutewithme.com/2014/08/20/cisco-aci-bootcamp-notes-and-thoughts-pt-3/, retrieved on Nov. 16, 2018 (Year: 2014).*
Arjan van der Valk, Jan Heijdra, NL VMUG UserCon—Mar. 19, 2015, nlvmug.com/wp-content/uploads/2016/12/Platinum-sponsor-Cisco-Securing-the-DC-by-integrating-Cisco-ACI-in-a-VMware-vSphere-and-NSXv-environment.pdf, retrieved on Nov. 16, 2018 (Year: 2015).*
Cisco, Principles of Application Centric Infrastructure, Nov. 15, 2013, Cisco Nexus 9000 Series Switches White Papers (Year: 2013).*
Cisco Systems, Inc., "Cisco Application Centric Infrastructure Fundamentals," (Chapters 3, 4, 5 and 9 only), Sep. 29, 2016; 98 pages.

* cited by examiner

*Primary Examiner* — Jorge A Chu Joy-Davila

(57) ABSTRACT

Aspects of the embodiments are directed to forming a virtual machine management (VMM) domain in a heterogeneous datacenter. Aspects can include mapping an endpoint group to multiple VMM domains, each VMM domain associated with one or more virtual machine management systems of a single type that each share one or more management system characteristics; instantiating a virtual switch instance, the virtual switch instance associated with a the VMM domain; and instantiating the endpoint group mapped to the VMM domain as a network component associated with the virtual switch instance.

20 Claims, 5 Drawing Sheets

US 10,891,147 B1

EXTENDING APPLICATION TIERS ACROSS A LARGE-SCALE HETEROGENEOUS DATA CENTER

CROSS-REFERENCE TO RELATED APPLICATION

This application claims the benefit of priority under 35 U.S.C. 119(e) to U.S. Provisional Application Ser. No. 62/334,138, entitled "STRETCHING APPLICATION TIERS WITH UNIFORM POLICY ENFORCEMENT ACROSS A LARGE-SCALE HETEROGENEOUS DATA CENTER," filed on May 10, 2016, which is hereby incorporated by reference in its entirety.

FIELD

This disclosure is directed to stretching application tiers with uniform policy enforcement across a large-scale heterogeneous data center.

BACKGROUND

A data center may be heterogeneous, deploying virtualized compute resources with different types of hypervisors, such as VMWare ESXi and Microsoft Hyper-V and others. Different hypervisors are managed by different Virtual Machine (VM) management systems, such as VMWare Vcenter and Microsoft SCVMM. The data center may also be large-scale, consisting of multiple Points of Delivery (PoDs) or clusters, which cannot be managed by a single VM management system.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

DETAILED DESCRIPTION

Application tiers such as web, application, and database are deployed on an individual VM management system. The policies are enforced within the compute resource controlled by the VM management system. This approach might not work in a modern large-scale heterogeneous data center, where applications should be able to be deployed in different types of hypervisors. A new approach of stretching common policy framework across multiple compute platforms is described.

The policy framework in a modern data center should accommodate multiple tenants. A tenant can have multiple application tiers. Applications in one application tier should be deployed only in a subset of available compute resources. On the other hand, applications in different tiers could be deployed in different subsets of compute resources. The partitioning of compute resources is performed to achieve efficient use of network resources, as scarce network resources such as VLANs should be reused among partitions.

Scalability is an important requirement for the modern data center policy framework. To make the policy framework scalable, the End Point Group (EPG) is introduced. An EPG contains a collection of endpoints that share common policy requirements such as security, QoS, and services. Application policies can be applied between EPGs, instead of endpoints directly, in the form of contracts. In a large-scale heterogeneous data center, an EPG can be instantiated in different types of hypervisors controlled by different VM management systems.

This disclosure describes a VMM domain to accommodate diverse VM management systems and reuse network resources. Each VMM domain can be associated with a unique VM management system, such as vCenter or SCVMM. More generally, each VMM domain can be associated with one or more virtual machine management systems of a single type that each share one or more management system characteristics. Each VMM domain can include an endpoint group for each application tier associated with one or more tenants. This disclosure also describes a mapping between a tenant EPG to multiple VMM domains to take advantage of diverse compute resources. The tenant can use resources supported by different VM management systems so that any particular tenant is not limited to using a single VM management system that supports endpoint groups for the application tiers needed by the tenant.

In some embodiments, a VMM domain can be instantiated as a virtual switch instance. An EPG can be instantiated as a network component (e.g., port group or VM network-element) tied to a virtual switch instance associated with a VMM domain it is mapped to.

Aspects of the embodiments permit application tiers to stretch across multiple VM management domains. Aspects of the embodiments provide consistent and uniform policy enforcement framework in a heterogeneous data center.

Figure 1:
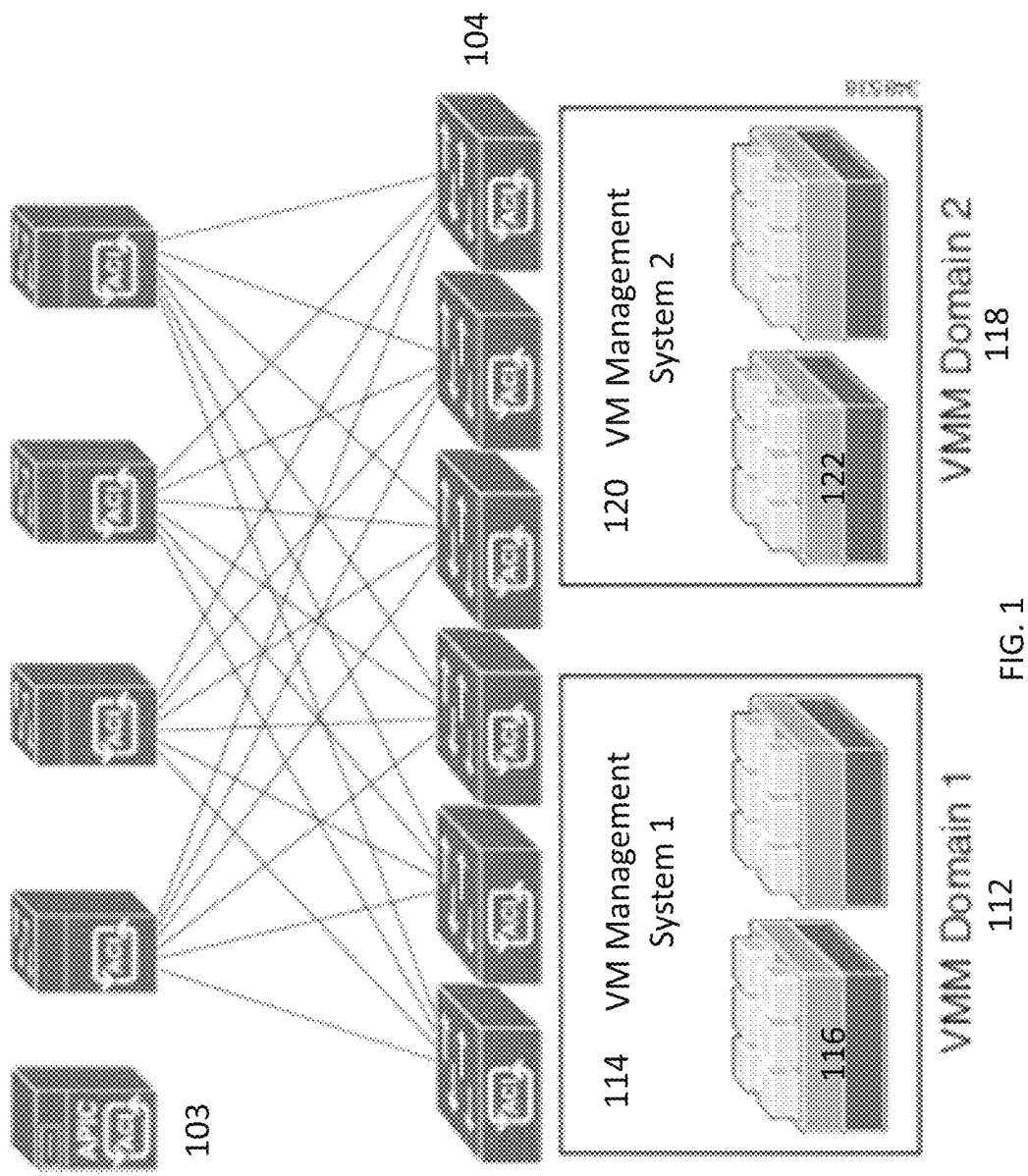
FIG. 1 is a schematic block diagram of a heterogeneous datacenter in accordance with embodiments of the present disclosure.

FIG. 1 is a schematic block diagram of a heterogeneous datacenter in accordance with embodiments of the present disclosure. In the heterogeneous datacenter 100 of FIG. 1, there are two types of VM management systems: VM Management System 1 114 and VM Management System 2 120. As an example, VM Management system 1 114 could be VMWare VCenter managing a hypervisor 116, such as VMWare ESXi hypervisor; and VM Management system 2 120 could be a SCVMM managing a hypervisor 122, such as Microsoft Hyper-V. The hypervisors can be connected to leaf switches. The leaf switches can be connected to spine switches in a Clos Network topology. A Software Defined Network (SDN) controller such as an Application Centric Infrastructure (ACI) Application Policy Infrastructure Controller (APIC) 103 is used to control the network fabric and VM management systems.

This disclosure describes supporting multitenant application tiers with uniform policy enforcement in a large-scale heterogeneous data center environment.

This disclosure describes Virtual Machine Manager (VMM) Domains 112 and 118 to accommodate diverse VM management systems and the reuse of network resources. A VMM domain contains a collection of VM management systems, such as VMWare vCenters, which share the same characteristics, such as the way to implement an end point group (EPG). Pools of network resources such as VLANs and VxLAN multicast addresses are tied to a VMM domain. Across VMM domains, the network resource pools can be overlapped, which means network resources can be reused.

VMM domains do not put a restriction on tenant application tier deployment. Instead, an application tier can be deployed among multiple VMM domains and uniform policy enforcement done across VMM domains. To this aim, the following policy components are disclosed:

Tenant profile: Each tenant in a data center will have its own profile, which contains a set of EPGs corresponding to the tiers of applications it intends to deploy.

VMM domain mapping: A tenant's application tier should be able to be deployed in different types of hypervisors. With this goal in mind, a mapping between an EPG and multiple VMM domains is described. An application of the EPG can be deployed in any hypervisor managed by a VM management system which belongs to one of the VMM domains.

Figure 2:
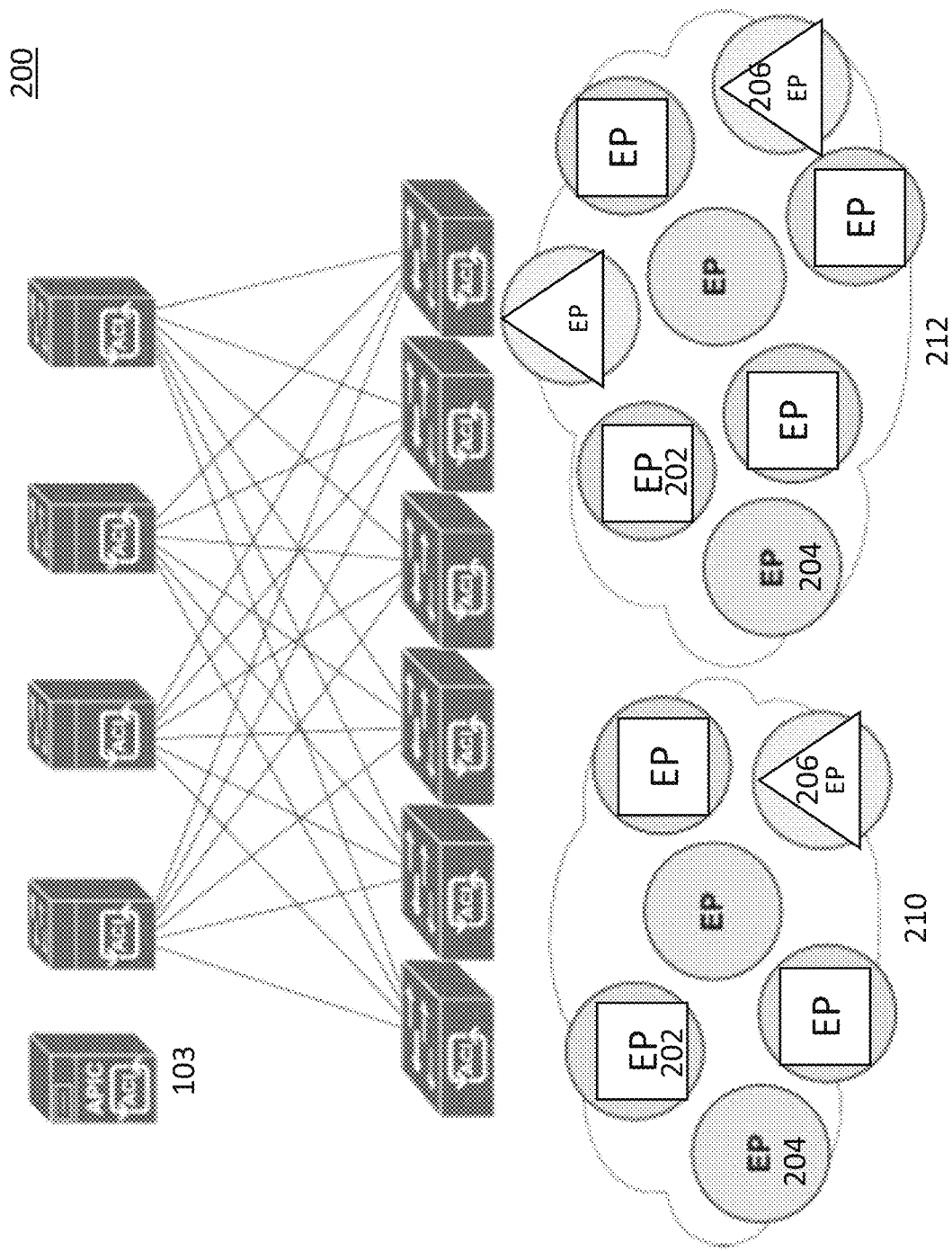
FIG. 2 is a schematic block diagram of a datacenter with virtual machine management (VMM) domains and associated application tiers in accordance with embodiments of the present disclosure.

FIG. 2 is a schematic block diagram of a datacenter 200 with virtual machine management (VMM) domains and associated application tiers in accordance with embodiments of the present disclosure. Suppose there are two tenants, T1 and T2, in a data center. Tenant T1 profile defines square 202 and circle 204 EPGs for applications tiers database and application, respectively; tenant T2 defines triangle 206 EPGs for application tier database. A first VMM domain 210 and a second VMM domain 212 are identified. The first VMM domain 210 contains VM management system VM Management System 1 114 and the second VMM domain 212 contains VM Management System 2 120. In order to deploy applications across the VM domains, mappings are defined that map each of the three EPGs to the two VMM domains 210 and 212 shown in FIG. 2. The mapping can be performed through a configuration routine. For example, EPG 202 can be attached to domains 210 and 212 through a configuration. As shown in FIG. 2, an EPG can have applications deployed in both VMM domains and one VMM domain can contain end points of different EPGs.

Though FIG. 2 shows two VMM domains, this disclosure contemplates more than two VMM domains. For example, one or more VMM domains can be created for each VM management system supporting the datacenter.

Described below are further details of VMM domain and EPG instantiations as well as policy provisioning:

A VMM domain can be instantiated as a virtual switch instance through VM management systems. For example, if the VMM domain contains VMWare vCenters, a Distributed Virtual Switch (DVS) is created in each vCenter for the VMM domain. If the VMM domain contains Microsoft SCVMM, a logical switch is created in each SCVMM for the VMM domain.

Once an EPG is mapped to the VMM domain, the EPG can be instantiated as a network component tied to the virtual switch instance associated with the VMM domain. For example, if the VMM domain contains VMWare vCenters, a port group is created in each DVS associated with the VMM domain for the EPG. On the other hand, if the VMM domain contains Microsoft SCVMM, a VM network is created in each logical switch associated with the VMM domain for the EPG.

Figure 3:
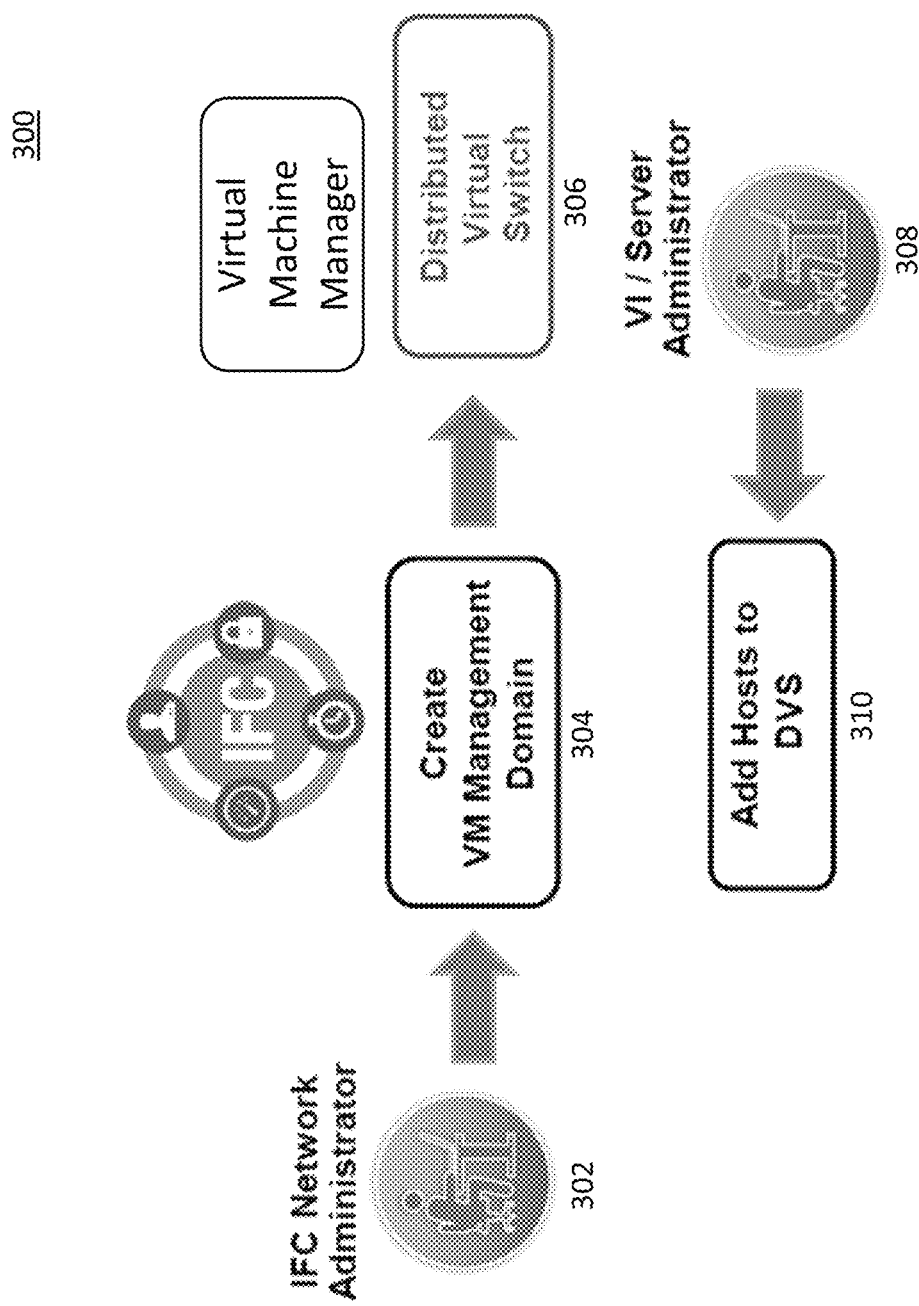
FIG. 3 is a schematic diagram of an example embodiment of the creation of VMM domain in accordance with embodiments of the present disclosure.

FIG. 3 is a schematic diagram 300 of an example embodiment of the creation of VMM domain in accordance with embodiments of the present disclosure. In FIG. 3, a network administrator 302 creates a VMM domain 304 through e.g., an application-centric infrastructure (ACI) controller (also known as IFC) user interface. In this example, the ACI controller uses VMWare APIs to create a distributed virtual switch (DVS) 306. Once the DVS 306 is created, a server administrator 308 can add ESXi hosts 310 (or other hypervisor types) to the DVS through a vCenter interface.

Figure 4:
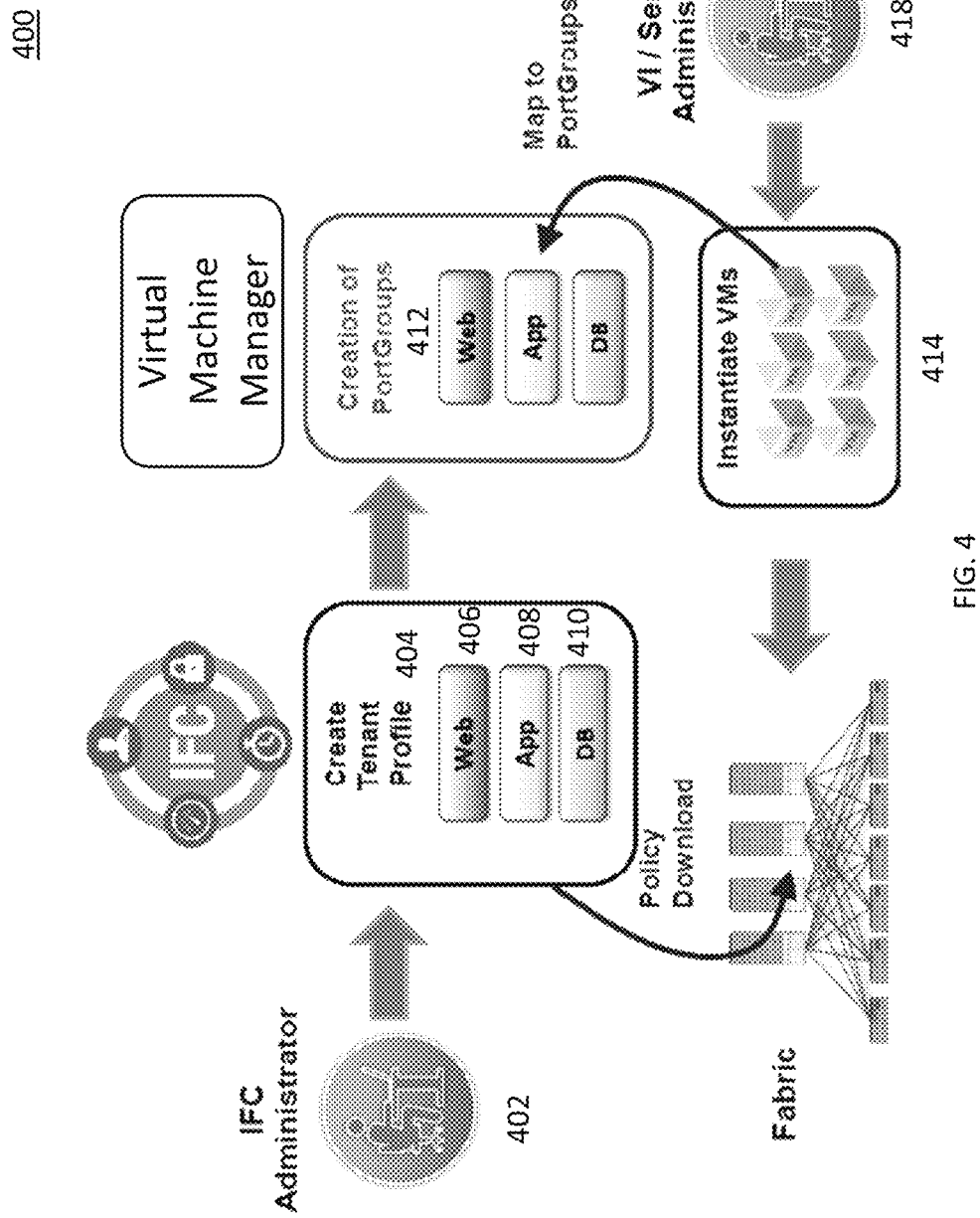
FIG. 4 is a schematic block diagram of an example embodiment of the creation of VMM domain in accordance with embodiments of the present disclosure.

FIG. 4 is a schematic block diagram 400 of a further example embodiment of the creation of VMM domain in accordance with embodiments of the present disclosure. In FIG. 4, the network administrator 402 creates a tenant profile 404 with three EPGs, web 406, app 408, and database (db) 410. The ACI controller use VMWare APIs to create three port groups 412 tied to the previously created DVS (from FIG. 3). Once the port groups are ready to use, the server administrator 418 attaches virtual network interface cards (vNICs) 414 of application VMs to the port groups 412 according to the application tiers they belong.

Figure 5:
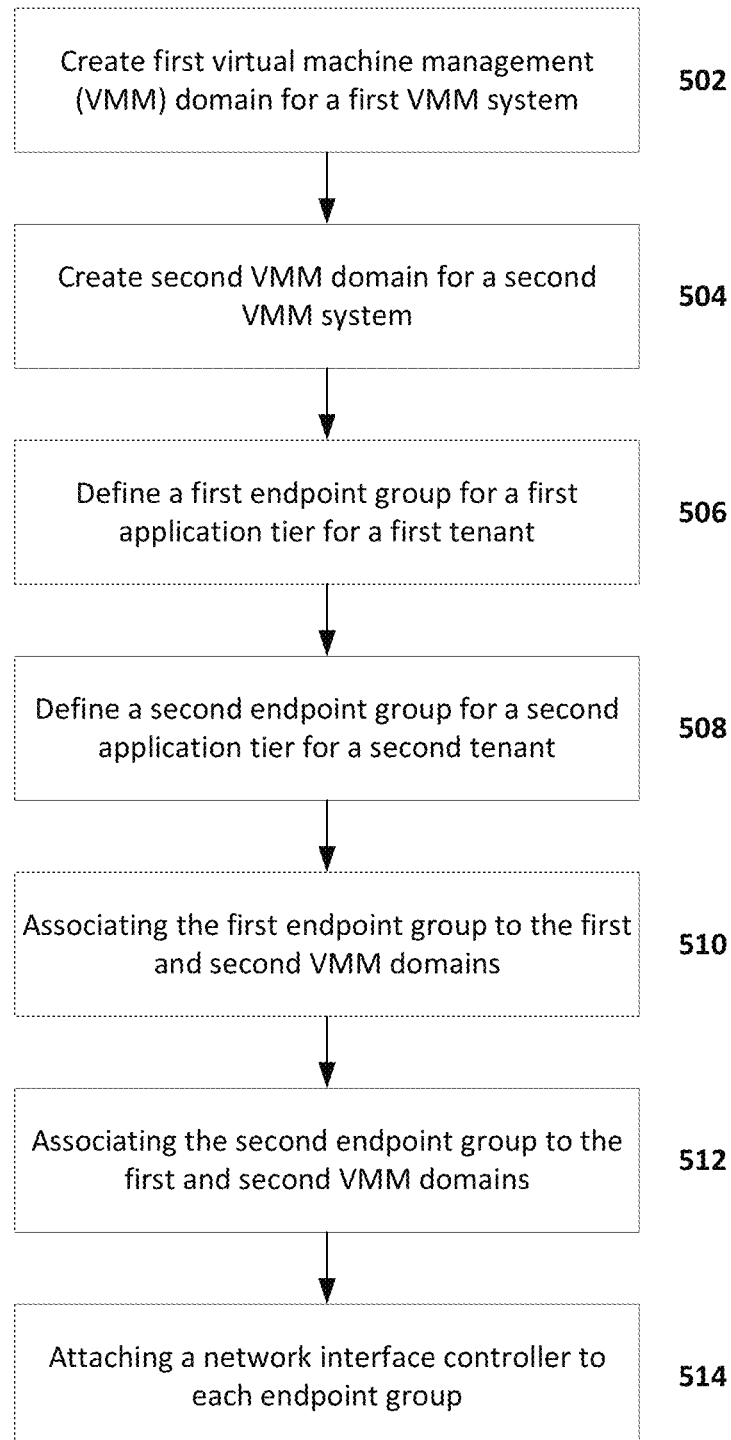
FIG. 5 is a process flow diagram for stretching application tiers with uniform policy enforcement across a large-scale heterogeneous data center in accordance with embodiments of the present disclosure.

FIG. 5 is a process flow diagram 500 for stretching application tiers with uniform policy enforcement across a large-scale heterogeneous data center in accordance with embodiments of the present disclosure. A first virtual machine management (VMM) domain can be created for a first VMM system (502). A second VMM domain can be created for a second VMM system, the second VMM system different from the first VMM system (504).

A first tenant, Tenant 1, can be associated with a profile that includes one or more endpoint groups corresponding to application tiers used by Tenant 1 to run applications using the datacenter resources (506). Likewise, a second tenant, Tenant 2, can be associated with a profile that includes one or more endpoint groups corresponding to application tiers used by Tenant 2 to run applications using the datacenter resources (508). Each endpoint group for Tenant 1 can be mapped to the first VMM domain and to the second VMM domain (510). Each endpoint group for Tenant 2 can be mapped to the first VMM domain and to the second VMM domain (512). A network interface controller (NIC) such as a virtual NIC (vNIC) can be attached to each endpoint group to direct traffic to any of the appropriate endpoint groups required by the application to run (514). The application can use endpoints associated with any of the VMM domains within which the endpoint is associated.

What is claimed is:

1. A method of extending application tiers across virtual machine management (VMM) domains, the method comprising:

defining a first VMM domain associated with a first VMM system type; defining a second VMM domain associated with a second VMM system type, the second VMM system type different from the first VMM system type;

defining a first endpoint group associated with a first application tier of an application;

defining a second endpoint group associated with a second application tier of the application;

associating the first endpoint group with each of the first and second VMM domains;

associating the second endpoint group with each of the first and second VMM domains;

defining a first tenant profile, the first tenant profile associated with the first endpoint group and at least one third endpoint group forming a first tenant that is mapped to the first and second VMM domains;

defining a second tenant profile, the second tenant profile associated with the second endpoint group and at least one fourth endpoint group forming a second tenant that is associated with the first and second VMM domains; and attaching a network interface controller to each of the first and second endpoint groups to direct traffic of the first and second application tiers to any appropriate endpoint group from among the first endpoint group and the second endpoint group within any of the first VMM domain and the second VMM domain, to run the application, wherein the second VMM domain is a different type from the first VMM domain.

2. The method of claim 1, wherein the first application tier comprises a webserver, a database, or another application.

3. The method of claim 1, wherein the associating the first endpoint group to each of the first and second VMM domains comprises attaching the first endpoint group to both of the first and second VMM domains; and wherein the associating the second endpoint group to each of the first and second VMM domains comprises attaching the second endpoint group to both of the first and second VMM domains.

4. The method of claim 1, further comprising:

instantiating the first VMM domain as a first virtual switch instance using a first VMM system associated with the first VMM domain; and instantiating the second VMM domain as a second virtual switch instance using a second VMM system associated with the second VMM domain.

5. The method of claim 4, further comprising:

instantiating the first endpoint group as a first network component logically linked to the first virtual switch instance; and instantiating the second endpoint group as a second network component logically linked to the second virtual switch instance.

6. The method of claim 5, wherein the first VMM system associated with the first VMM domain comprises a VMWare vCenter and the first virtual switch instance comprises a distributed virtual switch (DVS); and wherein instantiating the first endpoint group comprises creating a port group in the DVS instantiated for the first VMM domain associated with the first endpoint group.

7. The method of claim 6, wherein the second VMM system associated with the second VMM domain comprises a System Center VMM (SCVMM) and the second virtual switch instance comprises a logical switch; and wherein instantiating the second endpoint group comprises creating a virtual machine network in the logical switch instantiated for the second VMM domain associated with the second endpoint group.

8. The method of claim 1, wherein defining the first VMM domain includes instantiating a distributed virtual switch and defining the second VMM domain includes instantiating a logical switch.

9. A computer-readable non-transitory medium comprising one or more instructions for extending application tiers across virtual machine management (VMM) domains, the instructions when executed on a processor are operable to:

define a first VMM domain associated with a first VMM system type through an application centric infrastructure (ACI) controller interface;

define a second VMM domain associated with a second VMM system type through the ACI controller interface, the second VMM system type different than the first VMM system type;

define, through the ACI controller interface, a first endpoint group associated with a first application tier of an application;

define, through the ACI controller interface, a second endpoint group associated with a second application tier of the application;

associate the first endpoint group with each of the first and second VMM domains;

associate the second endpoint group with each of the first and second VMM domains;

define a first tenant profile, the first tenant profile associated with the first endpoint group and at least one third endpoint group forming a first tenant that is mapped to the first and second VMM domains;

define a second tenant profile, the second tenant profile associated with the second endpoint group and at least one fourth endpoint group forming a second tenant that is mapped to the first and second VMM domains; and attach a network interface controller to each of the first and second endpoint groups to direct traffic of the first and second application tiers to any appropriate endpoint group from among the first endpoint group and the second endpoint group within any of the first VMM domain and the second VMM domain, to run the application, wherein the second VMM domain is a different type from the first VMM domain.

10. The computer-readable non-transitory medium of claim 9, wherein the first application tier and the second application tier comprise one or more of a webserver, a database, or another application.

11. The computer-readable non-transitory medium of claim 9, wherein the first endpoint group is associated to each of the first and second VMM domains by attaching the first endpoint group to both of the first and second VMM domains; and wherein the second endpoint group is associated to each of the first and second VMM domains by attaching the second endpoint group to both of the first and second VMM domains.

12. The computer-readable non-transitory medium of claim 9, wherein the instructions are further operable to:

instantiate the first VMM domain as a first virtual switch instance using a first VMM system associated with the first VMM domain; and instantiate the second VMM domain as a second virtual switch instance using a second VMM system associated with the second VMM domain.

13. The computer-readable non-transitory medium of claim 12, wherein the instructions are further operable to:

instantiate the first endpoint group as a first network component logically linked to the first virtual switch instance; and instantiate the second endpoint group as a second network component logically linked to the second virtual switch instance.

14. The computer-readable non-transitory medium of claim 13, wherein the first VMM system associated with the first VMM domain comprises a VMWare vCenter and the first virtual switch instance comprises a distributed virtual switch (DVS); and wherein the first endpoint group is instantiate by creating a port group in the DVS instantiated for the first VMM domain associated with the first endpoint group.

15. The computer-readable non-transitory medium of claim 14, wherein the second VMM system associated with the second VMM domain comprises a System Center VMM (SCVMM) and the second virtual switch instance comprises a logical switch; and wherein the second endpoint group is instantiated by creating a virtual machine network in the logical switch instantiated for the second VMM domain associated with the second endpoint group.

16. The computer-readable non-transitory medium of claim 9, wherein the first endpoint group is associated with said each of the first and second VMM domains and the second endpoint group is associated with said each of the first and second VMM domains by mapping the respective endpoint group from among the first endpoint group and the second endpoint group to said each of the first and second VMM domains via a configuration procedure.

17. A network system comprising:
a processor configured to execute instructions to:
define a first virtual machine management (VMM) domain associated with a first VMM system type;
define a second VMM domain associated with a second VMM system type, the second VMM system type different from the first VMM system type;
define a first endpoint group associated with a first application tier of an application;
define a second endpoint group associated with a second application tier of the application;
associate the first endpoint group with each of the first and second VMM domains;
associate the second endpoint group with each of the first and second VMM domains,
define a first tenant profile, the first tenant profile associated with the first endpoint group and at least one third endpoint group forming a first tenant that is mapped to the first and second VMM domains;
define a second tenant profile, the second tenant profile associated with the second endpoint group and at least one fourth endpoint group forming a second tenant that is mapped to the first and second VMM domains; and
attach a network interface controller to each of the first and second endpoint groups to direct traffic of the first and second application tires to any appropriate endpoint group from among the first endpoint group and the second endpoint group within any of the first VMM domain and the second VMM domain, to run the application,
wherein the second VMM domain is a different type from the first VMM domain.

18. The network system of claim 17, wherein the processor associates the first endpoint group with said each of the first and second VMM domains and associates the second endpoint group with said each of the first and second VMM domains by mapping the respective endpoint group from among the first endpoint group and the second endpoint group to said each of the first and second VMM domains via a configuration procedure.

19. The network system of claim 17, wherein the processor is further configured to execute additional instruction to:
instantiate the first VMM domain as a first virtual switch instance using a first VMM system associated with the first VMM domain; and
instantiate the second VMM domain as a second virtual switch instance using a second VMM system associated with the second VMM domain.

20. The network system of claim 17, wherein the processor is configured to execute the instructions to define the first VMM domain by instantiating a distributed virtual switch and to define the second VMM domain by instantiating a logical switch.

* * * * *